United States Patent [19]

Olsson

[11] 4,201,556
[45] May 6, 1980

[54] DEVICE FOR CLEANING FABRIC FILTERS

[76] Inventor: Mats A. Olsson, Björkrisvägen 15, S-161 39 Bromma, Sweden

[21] Appl. No.: 894,392

[22] Filed: Apr. 7, 1978

[51] Int. Cl.² ............................................. B01D 46/10
[52] U.S. Cl. ............................................. 55/292; 55/96
[58] Field of Search ................................ 55/292, 277, 96; 210/DIG. 22, 407

[56] References Cited

U.S. PATENT DOCUMENTS

| 3,118,748 | 1/1964 | Delfs | 55/292 |
| 3,366,234 | 1/1968 | Suhm et al. | 55/292 X |
| 3,413,781 | 12/1968 | Abboud | 55/292 |
| 3,954,426 | 5/1976 | Brange | 55/292 X |

Primary Examiner—Kathleen J. Prunner
Attorney, Agent, or Firm—Berman, Aisenberg & Platt

[57] ABSTRACT

A device for cleaning a fabric filter from adhering dust comprises a loud speaker element forming a dividing wall or a part of such a wall between a chamber receiving the filter, and an open resonator which communicates with the chamber.

5 Claims, 4 Drawing Figures

DEVICE FOR CLEANING FABRIC FILTERS

The invention relates to a device for cleaning fabric filters from adhering dust by means of sound from a sound emitter.

Tests with such devices having a free radiating sound source of the type comprising a rigid membrane suspended by an elastic material, have shown that the cleaning effect on the fabric filter is very small. Considering that the sonic power of a loud speaker can be increased, especially at low frequencies, by placing the sound source in a resonance box, one could imagine that it would be possible to achieve a sufficiently high sonic pressure for cleaning the filter from adhering dust by arranging a resonance box in a filter housing. However, the problem encountered in an arrangement of that kind is that there is always in the filter housing a positive or negative pressure that is strong relative to the sonic pressure. Moreover, this pressure is not constant but varies within wide limits. It is, therefore, not possible to initiate motion of the sound generating membrane. Furthermore, the membrane will be pressed into or sucked out of the resonance box.

It is a primary object of the invention to provide a device for cleaning fabric filters from adhering dust by means of sound from a sound emitter wherein the problem encountered by pressure difference over the membrane is eliminated.

Another object of the invention is to provide a device for cleaning fabric filters from adhering dust by means of sound from a sound emitter wherein the sonic pressure is higher than that obtained in a closed resonance box.

A further object of the invention is to provide a device for cleaning fabric filters from adhering dust by means of sound from a sound emitter, which produces a cleaning effect on the fabric filter which is considerably higher than what reasonably could be expected.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, there is provided according to the invention, a device for cleaning a fabric filter arranged in a chamber, from adhering dust by means of sound, comprising a loud speaker element, an open resonator communicating with the chamber, and a partition wall between the chamber and the resonator, said loud speaker element forming at least a part of the partition wall.

The invention is based on the knowledge that a higher sonic pressure can be achieved by designing the resonance box as an open resonator the dimensions of which are tuned to the frequency to be amplified. There are two types of such resonators, viz. the Helmholtz resonator and the quarterwave resonator.

The Helmholtz resonator can be described as a resonance box with an air tunnel connecting the interior of the box with the surrounding space. To get the result wanted, the volume of the box and the length and area of the tunnel must be in a specific relation to the frequency to be amplified. In a particular case the Helmholtz resonator has an opening instead of a tunnel, a certain tunnel effect being obtained due to the air movement back and forth through the opening.

The quarter-wave resonator has a sound source mounted at one end of a tube. The length of the tube is equal to a quarter of the wavelength of the frequency to be amplified. Resonance is obtained at one quarter of the wavelength concerned as well as at three quarters, five quarters etc.

The accompanying drawings which are incorporated in and constitute a part of this specification, illustrate embodiments of the invention and, together with the description, serve to explain the principles of the invention.

Figures 1, 2:
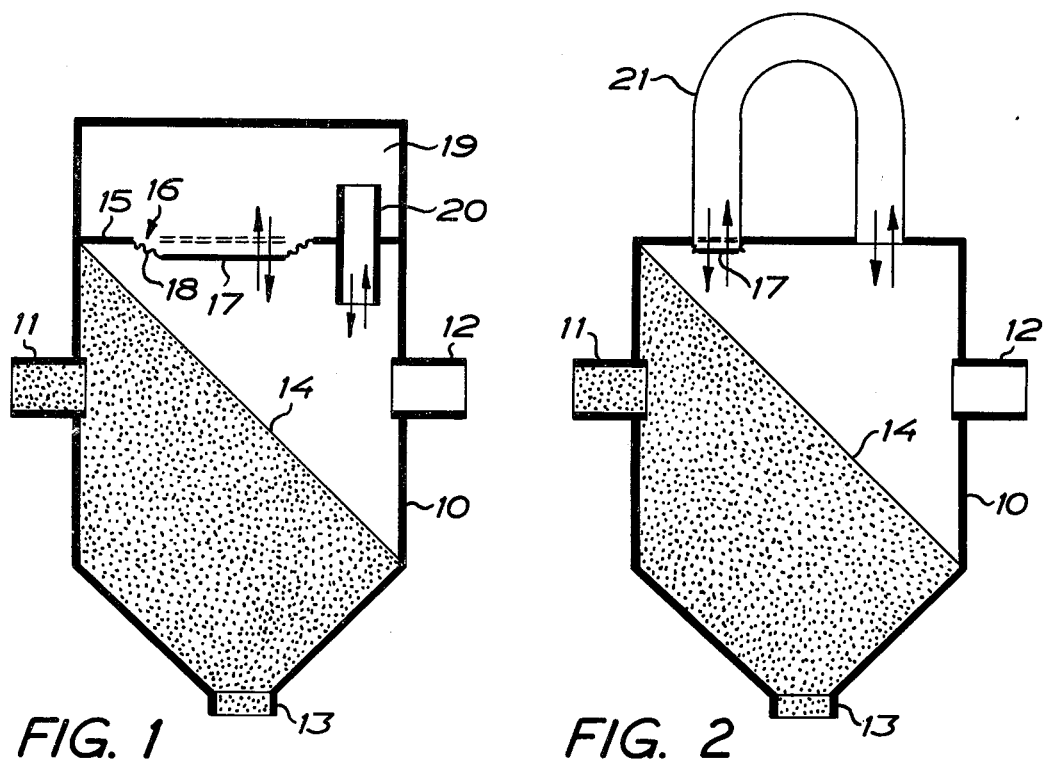
FIG. 1 is a vertical sectional view of a filter apparatus having a Helmholtz resonator.
FIG. 2 is a vertical sectional view of a filter apparatus having a quarter-wave resonator.

In FIGS. 1 to 4 there is shown a filter apparatus with a filter chamber 10 having an inlet 11 for gas with entrained dust, an outlet 12 for filtered gas and an outlet 13 for separated dust. Within the filter chamber there is a fabric filter 14 through which the gas has to pass between the inlet 11 and the outlet 12 for separation of dust from the gas.

Figure 4:
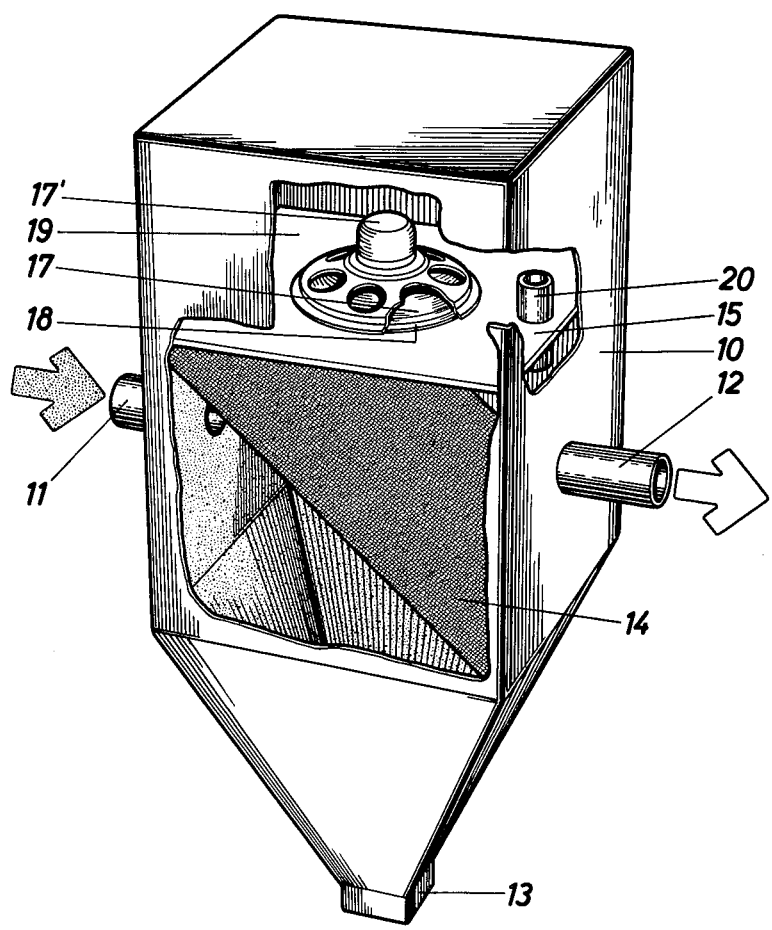
FIG. 4 is a perspective view with parts broken away of the filter apparatus shown in FIG. 1.

In the filter chamber 10 there is arranged in the filter apparatus according to FIGS. 1 and 4 a partition wall 15 with an opening 16 wherein a rigid membrane 17 is suspended in an elastic material 18. The elastically suspended membrane constitutes a loud speaker element and can be operated in the direction of the arrows by a driving unit 17', FIG. 4, for instance a conventional driving system of an electrical loud speaker. By the partition wall 15 a resonance box 19 for the loud speaker element is divided from the chamber 10, the resonance box 19 being designed as a Helmholtz resonator with a tunnel 20 connecting the resonance box 19 with the part of the chamber 10 that contains the filter 14. As mentioned above the tunnel 20 may be replaced by a simple opening in a well-known manner.

In FIG. 2 there is connected to the filter chamber 10 a quarter-wave resonator 21 the membrane 17 being arranged between the resonator and the filter chamber at one end of the resonator, as previously described, and is provided with a driving system, while a free connection is provided between the resonator and the interior of the filter chamber at the other end of the resonator. The free connection thus provided, communicates the resonator with the interior of the filter chamber.

In some cases the arrangement according to FIGS. 1 and 4 or FIG. 2 may be insufficient for cleaning the filter 14, for instance if the fluid to be cleaned is a hot and humid process gas or if dust appears also on the clean side of the filter. In such a case the embodiment shown in FIG. 3 with a double resonator can be used.

Figure 3:
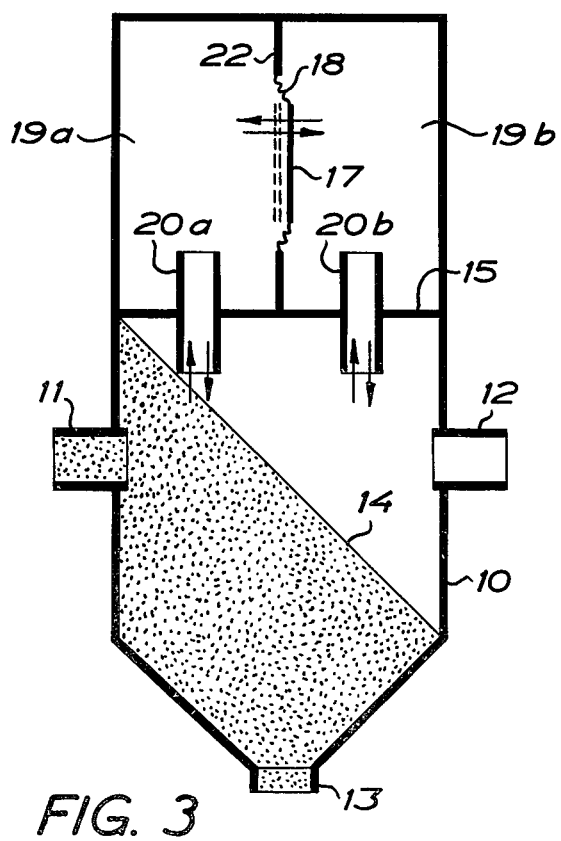
FIG. 3 is a vertical sectional view of a filter apparatus having a double Helmholtz resonator.

According to FIG. 3 the resonator confined by the partition wall 15 comprises two resonator chambers 19a and 19b separated by a partition wall 22. The resonator chambers are in connection with the part of the filter chamber 10 containing the filter 14 through tunnels 20a and 20b, respectively. The membrane 17 is suspended in an opening in the partition wall 22 by an elastic material 18 and has a driving system in the manner previously mentioned.

In the embodiment shown in FIG. 3 the two resonator portions will operate in opposition to each other, i.e. the effect of one resonator portion will be equalized by the effect of the other resonator portion. Therefore, it is suggested according to the invention to shift the phase of one sound wave half a wavelength in relation to the other. Such phase shift can be achieved in the Helmholtz resonator by designing the two resonator chambers not quite symmetrically. Also in the embodiment with a double resonator according to FIG. 3, the resonator can comprise a quarter-wave resonator, the required phase shift being achieved by giving one tube portion the length of one quarter of the wavelength and the other the length of three quarters of the wavelength. In both cases the two resonator portions should have the same frequency, be operated by a common loud speaker element and be connected to a common filter chamber.

It will be apparent to those skilled in the art that various modifications and variations could be made in the device of the invention without departing from the scope of the invention.

I claim:

1. A device for cleaning a filter by vibrations caused by sound waves generated at a predetermined frequency, comprising:
   (a) a first chamber within which said filter is disposed;
   (b) a closed second chamber having at least one portion forming a resonator tuned to said predetermined frequency;
   (c) a partition wall, one side of which forms a boundary of said at least one portion;
   (d) sound wave generating means disposed in said partition wall for generating sound waves at said predetermined frequency on opposite sides of said partition wall; and
   (e) means communicating said at least one portion with said first chamber.

2. A device according to claim 1 wherein said second chamber comprises two resonator portions, each portion being tuned to said predetermined frequency but dimensioned with respect to each other to phase shift the sound waves in each portion with respect to each other, said partition wall being disposed between said resonator portions and each of said resonator portions communicating with said first chamber.

3. A device according to claim 1 or 2 wherein said resonator or resonators are Helmholtz resonators.

4. A device according to claim 1 wherein said resonator is a quarter-wave resonator.

5. A device according to claim 1 or 2 wherein said sound wave generating means is an electrically driven loud speaker.